United States Patent
Verykios et al.

(10) Patent No.: US 10,960,372 B2
(45) Date of Patent: Mar. 30, 2021

(54) CATALYTICALLY HEATED FUEL PROCESSOR WITH REPLACEABLE STRUCTURED SUPPORTS BEARING CATALYST FOR FUEL CELL

(75) Inventors: Xenophon Verykios, Patra (GR); Thomas Halkides, Patra (GR); Andreas Stavrakas, Patra (GR); Aris Basayiannis, Patra (GR)

(73) Assignee: Helbio S.A., Patra (GR)

( * ) Notice: Subject to any disclaimer, the term of this patent is extended or adjusted under 35 U.S.C. 154(b) by 83 days.

(21) Appl. No.: 14/383,896

(22) PCT Filed: Mar. 8, 2012

(86) PCT No.: PCT/GR2012/000011
§ 371 (c)(1),
(2), (4) Date: Sep. 8, 2014

(87) PCT Pub. No.: WO2013/132276
PCT Pub. Date: Sep. 12, 2013

(65) Prior Publication Data
US 2015/0118123 A1    Apr. 30, 2015

(51) Int. Cl.
*B01J 8/02*    (2006.01)
*C01B 3/38*    (2006.01)
(Continued)

(52) U.S. Cl.
CPC .......... *B01J 8/0285* (2013.01); *B01J 19/249* (2013.01); *C01B 3/323* (2013.01); *C01B 3/384* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,714,593 A | 12/1987 | Naito et al. | |
| 4,909,808 A | 3/1990 | Voecks | |

(Continued)

FOREIGN PATENT DOCUMENTS

| | | | |
|---|---|---|---|
| DE | 2610556 B1 | 6/1977 | |
| EP | 0124226 A2 | 11/1984 | |

(Continued)

OTHER PUBLICATIONS

Canadian Office Action dated Jun. 27, 2019 corresponding to counterpart Patent Application CA 2,862,527.

(Continued)

*Primary Examiner* — Imran Akram
(74) *Attorney, Agent, or Firm* — Carter, DeLuca & Farrell LLP; George Likourezos

(57) ABSTRACT

A highly compact heat integrated fuel processor, which can be used for the production of hydrogen from a fuel source, suitable to feed a fuel cell, is described. The fuel processor assembly comprises a catalytic reforming zone (29) and a catalytic combustion zone (28), separated by a wall (27). Catalyst able to induce the reforming reactions is placed in the reforming zone and catalyst able to induce the combustion reaction is placed in the combustion zone, both in the form of coating on a suitable structured substrate, in the form of a metal monolith. Fe—Cr—Al—Y steel foils, in corrugated form so as to enhance the available area for reaction, can be used as suitable substrates. The reforming and the combustion zones can be either in rectangular shape, forming a stack with alternating combustion/reforming zones or in cylindrical shape forming annular sections with alternating combustion/reforming zones, in close contact to each other. The close placement of the combustion and reforming catalyst facilitate efficient heat transfer through (Continued)

the wall which separates the reforming and combustion chambers.

14 Claims, 6 Drawing Sheets

(51) Int. Cl.
*C01B 3/32* (2006.01)
*H01M 8/06* (2016.01)
*B01J 19/24* (2006.01)

(52) U.S. Cl.
CPC ............ *H01M 8/06* (2013.01); *B01J 2208/02* (2013.01); *B01J 2219/247* (2013.01); *B01J 2219/2453* (2013.01); *B01J 2219/2454* (2013.01); *B01J 2219/2458* (2013.01); *B01J 2219/2459* (2013.01); *B01J 2219/2465* (2013.01); *B01J 2219/2479* (2013.01); *B01J 2219/2485* (2013.01); *C01B 2203/0233* (2013.01); *C01B 2203/0811* (2013.01); *C01B 2203/1005* (2013.01); *C01B 2203/107* (2013.01); *C01B 2203/1035* (2013.01); *C01B 2203/1047* (2013.01); *C01B 2203/1082* (2013.01); *C01B 2203/1229* (2013.01); *C01B 2203/1241* (2013.01)

(56) References Cited

U.S. PATENT DOCUMENTS

| | | | | |
|---|---|---|---|---|
| 4,935,037 A * | 6/1990 | Koyama | ............... | B01J 8/062 |
| | | | | 48/94 |
| 5,639,431 A * | 6/1997 | Shirasaki | ............... | C01B 3/501 |
| | | | | 422/212 |
| 5,670,269 A * | 9/1997 | Hamada | ............... | B01J 19/249 |
| | | | | 429/415 |
| 6,387,554 B1 | 5/2002 | Verykios | | |
| 6,616,909 B1 | 9/2003 | Tonkovich et al. | | |
| 7,037,485 B1 * | 5/2006 | Drnevich | ............... | C01B 3/56 |
| | | | | 423/652 |
| 2002/0042035 A1 * | 4/2002 | Komiya | ............... | H01M 8/0631 |
| | | | | 431/268 |
| 2002/0146359 A1 | 10/2002 | Lomax et al. | | |
| 2002/0168308 A1 * | 11/2002 | Loffler | ............... | F28F 3/02 |
| | | | | 422/211 |
| 2003/0105172 A1 | 6/2003 | Bowe et al. | | |
| 2004/0068933 A1 * | 4/2004 | Nakamura | ............... | C01B 3/48 |
| | | | | 48/127.9 |
| 2004/0105795 A1 | 6/2004 | Gough | | |
| 2004/0187386 A1 * | 9/2004 | Wangerow | ............... | C01B 3/384 |
| | | | | 48/198.3 |
| 2004/0258587 A1 | 12/2004 | Bowe et al. | | |
| 2005/0123472 A1 * | 6/2005 | Hall | ............... | B01J 19/088 |
| | | | | 423/651 |
| 2007/0258872 A1 | 11/2007 | West et al. | | |
| 2007/0258883 A1 * | 11/2007 | West | ............... | C01B 3/382 |
| | | | | 423/652 |
| 2009/0064579 A1 * | 3/2009 | Wakasugi | ............ | B01J 19/0093 |
| | | | | 48/76 |
| 2009/0133259 A1 * | 5/2009 | Yoshida | ............... | B01J 8/0492 |
| | | | | 29/890.036 |
| 2009/0158659 A1 * | 6/2009 | Yamazaki | ............... | C01B 3/38 |
| | | | | 48/116 |
| 2009/0258259 A1 * | 10/2009 | Leshchiner | ............... | C01B 3/16 |
| | | | | 429/423 |
| 2009/0317671 A1 * | 12/2009 | Ukai | ............... | B01J 8/0496 |
| | | | | 429/425 |
| 2010/0015480 A1 * | 1/2010 | Mukai | ............... | B01J 8/0469 |
| | | | | 429/410 |
| 2010/0043289 A1 * | 2/2010 | England | ............... | B01J 19/2485 |
| | | | | 48/116 |
| 2010/0178219 A1 | 7/2010 | Verykios et al. | | |
| 2010/0254864 A1 * | 10/2010 | Itsuki | ............... | H01M 8/0618 |
| | | | | 422/629 |
| 2010/0261074 A1 * | 10/2010 | Edlund | ............... | B01J 19/249 |
| | | | | 429/416 |

FOREIGN PATENT DOCUMENTS

| | | |
|---|---|---|
| EP | 0922666 A1 | 6/1999 |
| EP | 1024111 A1 | 8/2000 |
| EP | 1361919 A1 | 11/2003 |
| EP | 1679111 A2 | 7/2006 |
| EP | 1679758 A1 | 7/2006 |
| EP | 1767265 A2 | 3/2007 |
| EP | 2158962 A1 | 3/2010 |
| JP | S58176103 A | 10/1983 |
| WO | 9902263 A1 | 1/1999 |
| WO | 2008146052 A1 | 12/2008 |

OTHER PUBLICATIONS

International Search Report dated Nov. 29, 2012 and Written Opinion completed Nov. 8, 2012 corresponding to counterpart Int'l Patent Application PCT/GR2012/000011.
Lattner J R et al: "Comparison of methanol-based fuel processors for PEM fuel cell systems", Applied Catalysis B: Environmental, Elsevier, Amsterdam, NL, vol. 56, No. 1-2,Mar. 10, 2005, pp. 149-169, XP025331817, ISSN: 0926-3373.
Delsman et al: "Comparison Between Conventional Fixed-Bed and Microreactor Technology for a Portable Hydrogen Production Case", Chemical Engineering Research and Design, Part A, Institution of Chemical Engineers, vol. 83, No. 9, Sep. 1, 2005, pp. 1063-1075.
International Search Report issued by the European Patent Office in connection with International Application No. PCT/GR2012/000004, dated May 22, 2012.
Written Opinion of the International Searching Authority issued by the European Patent Office in relation to International Application No. PCT/GR2012/000004 dated May 22, 2012.
European Office Action received from the European Patent Office in relation to EP Application No. 12709166 dated Apr. 30, 2020.

\* cited by examiner

CATALYTICALLY HEATED FUEL PROCESSOR WITH REPLACEABLE STRUCTURED SUPPORTS BEARING CATALYST FOR FUEL CELL

FIELD OF THE INVENTION

This invention relates to very compact fuel processor assemblies where hydrocarbons or oxygenates are reformed to produce a hydrogen rich stream which can be fed to a fuel cell for electrical and thermal energy production.

BACKGROUND OF THE INVENTION

The use of hydrogen as an alternative energy vector is progressing along the road to implementation. The use of hydrogen in fuel cells to produce electricity or to co-generate heat and electricity, represents the most environmentally friendly energy production process due to the absence of any pollutant emissions. Most importantly, hydrogen can be produced from renewable energy sources, such as biofuels, alleviating concerns over the long-term availability of fossil fuels and energy supply security.

Large scale production of hydrogen is well understood and widely practiced in refineries and chemical plants—particularly in the ammonia production industry. For industrial applications requiring smaller quantities, hydrogen is usually transported either cryogenically or in highly compressed form. The reason is that the technology for large scale hydrogen production can not be easily downscaled. Furthermore, for hydrogen to be successfully introduced into the transportation and distributed energy production sectors, refueling and distribution networks must be established.

The problem lies in the low energy density of hydrogen which makes its transportation very inefficient and expensive. Transporting hydrogen in compressed or liquid form requires specialized and bulky equipment. This minimizes the amount of hydrogen which can be safely carried, increasing resource consumption and cost. It is, then, apparent that the hydrogen infrastructure required must be based on distributed production facilities. This applies to both, hydrogen as industrial chemical of medium or low consumption and, especially, as an energy vector.

Distributed hydrogen production facilities are the focus of numerous research and development activities. While the scale of such facilities is much smaller than the ones employed in the refineries and the large chemical plants, the basic steps remain the same. The most commonly employed method involves hydrogen production by the reformation of hydrocarbon fuels. These fuels must already have an established distribution network as to address the raw material availability concerns. They include natural gas, propane, butane (LPG) and ethanol as the representative of the biofuels. Natural gas is mostly methane and can be reformed according to the reaction:

$$CH_4 + H_2O \rightarrow CO + 3H_2 \quad \Delta H = 49.3 \text{ kcal/mol}$$

Propane, butane and ethanol can be reformed according to the reactions:

$$C_3H_8 + 3H_2O \rightarrow 3CO + 7H_2 \quad \Delta H = 119.0 \text{ kcal/mol}$$

$$C_4H_{10} + 4H_2O \rightarrow 4CO + 9H_2 \quad \Delta H = 155.3 \text{ kcal/mol}$$

$$C_2H_5OH + H_2O \rightarrow 2CO + 4H_2 \quad \Delta H = 57.2 \text{ kcal/mol}$$

As can be seen from the heats of reaction ($\Delta H$), all of the reforming reactions are highly endothermic, requiring substantial amounts of heat input which must be covered by an external heat supply. The heat deficit becomes even larger since the reactions take place at temperatures in the range of 700-900° C. which means that the reactants must be heated-up to such temperatures.

The reforming reactions typically take place in steam methane reformers. The reforming reaction takes place inside reforming tubes filled with a reforming catalyst. The reforming tubes are typically at high pressure of 20-30 bar. The required heat is typically supplied by placing the catalyst containing tubes of the reactor in rows inside a fired furnace. Between the rows are placed combustion burners that combust fuel and air in an open flame to provide the required heat. The high temperature of the flame necessitates that the combustion burners must be placed at a sufficient distance from the reforming tubes to prevent the tubes from high temperature exposure which could destroy the tubes. This is a rather inefficient arrangement since the hydrogen producing reforming reaction forms a small part of overall reactor. Materials limitations also dictate the avoidance of extremely high temperatures (>1000° C.) for the reforming reactor tubes, further limiting the ability to place the combustion burners in close proximity to the reforming tubes. All these mean that traditional steam methane reforming reactor configurations are very large and new configurations must be developed to decrease the size and the cost of such systems.

Different configurations have been proposed previously. For reactions requiring high heat fluxes, like the reforming reactions, U.S. Pat. No. 6,616,909 describe a reactor system consisting of porous foam catalysts in conjunction with microchannel reactors to obtain high rates of heat transfer. Such a configuration presents significant difficulties, such as excessive pressure drop, which will limit its effectiveness for large scale systems.

U.S. Pat. No. 6,387,554 describes a reactor consisting of a bundle of small diameter ceramic or metallic tubes enclosed in a thermally insulated vessel. Catalysts are deposited on the internal and external surfaces of the tubes and heat is transferred across the tube walls.

Part of the tubes may not be covered by catalyst and may act as heat exchange zones. Although this system resulted in a compact configuration the replacement of the catalyst is problematic and, as a result, the whole reactor must be replaced when the catalyst effectiveness for either the combustion or the reforming reaction declines.

The reactor described in EP0124226 comprises a double-tube reactor having a steam reforming catalyst coated on the outside of the inner tube. Alternatively, a set of inner tubes may be mounted in a first tube plate and a set of outer tubes in a second tube plate, the tube plates being disposed across a cylindrical shell so as to define a heat exchange zone. The heat source is a burner. Since the heat source is a burner the limitation of burner placement in relation to the reforming catalyst placement prevent the construction of a compact low cost system.

Another reactor described in EP1361919 comprises a tube plate which carries a number of elongated pockets extending transversely into a shell. A second tube plate extends across the shell and supports a number of tubular elongated conduits corresponding to the number of pockets. The conduits are open-ended and extend into and almost to the end of the pockets. Catalyst may be coated on the surfaces of the pockets and/or the conduits. However, in such a configuration catalyst replacement is problematic.

U.S. Patent Application US2010/0178219A1 by Verykios et al. describes a reformer whose tubes are coated with a combustion catalyst on the outer surface and a reforming catalyst on the inner surface. Such a configuration results in high rates of heat transport from the combustion side to the reforming side. However, in such a configuration catalyst replacement is a problem.

BRIEF DESCRIPTION OF THE INVENTION

The present invention relates to a reformer which produces a hydrogen rich stream by the process known as steam reforming of hydrogen containing compounds, such as hydrocarbons, oxygenates, etc. The reformer is comprised of two sections or zones: one where the steam reforming reactions take place and one where combustion of a fuel provides the heat necessary to carry out the reforming reactions. The two sections are separated by a metal partition and are in close thermal contact so as to facilitate the efficient transfer of heat from the combustion to the reforming sections. Combustion takes place over a suitable structured catalyst that can be removed and replaced when its effectiveness declines. A suitable catalyst support is made of a corrugated metal foil or other structured or ceramic materials, including metal monoliths. Corrugated metal material can be any metal or alloy that can withstand high temperatures, as for example alloys of the formulation FeCrAlY that are typically referred to as fecralloys and have been widely used as combustion catalyst supports. The combustion catalyst can be formed by at least one of these corrugated metal foils. Since the catalyst is coated on a separate material, it can be easily removed and replaced. The corrugated foil consists of multiple passages through which the combustion mixture can flow but it must also be in close contact with the combustion tube wall to facilitate efficient heat transfer into the adjacent reforming zone.

Steam reforming is a catalytic reaction and takes place over another suitable catalyst. The reforming catalyst can also be coated on a corrugated fecralloy sheet, or similar structure, and placed in the reforming zone, in close contact with the wall separating the reforming and combustion zones.

In one aspect of the invention, a heat integrated combustor/steam reformer assembly is provided for use in a fuel processor. A fuel and steam mixture is supplied to the reformer to be reformed and a fuel and air mixture is supplied to the combustor to be combusted.

As a feature, the integrated combustor/steam reformer assembly includes a tubular section defined by a cylindrical wall and a housing defining an axially extending concentric annular passage in heat transfer relation to each other. A fuel and air mixture is supplied to the tubular section. The inside wall of the tubular section is in contact with a fecralloy corrugated sheet coated with a catalyst that induces the combustion reaction. A fuel and steam mixture is supplied to the annular passage. The annular passage is in contact with a fecralloy corrugated sheet coated with a catalyst that induces the reforming reaction.

As another feature, the integrated combustor/steam reformer assembly includes two rectangular sections defined by steel plates in heat transfer relation to each other, as described above. In this case, fuel and steam mixture is supplied to one of the rectangular sections which contain reforming catalyst coated on corrugated fecralloy sheets which induces reforming reactions. A fuel and air mixture is supplied to the other rectangular passage which contains fecralloy sheets coated with suitable catalyst which promotes combustion reactions. With the use of suitably placed buffles (rectangular steel sticks) the fuel and air mixture passage forms an "S" shape. Steel strips placed suitably in the perimeter of the rectangular plate restrict flow to the desired direction and shape.

In another aspect of the invention the integrated combustor/steam reformer assembly includes a multitude of tubular sections defined by concentrically placed cylindrical walls separated from each other and supported on plates machined as to allow some of the cylindrical walls to pass through them and to be in fluid connection with only one side of the plate. One flow passage which passes through the machined plate is surrounded by another one which is restricted by the machined plate. The later is surrounded by a flow passage which passes through the machined plate and so on. The flow passages which are restricted by the machined plates communicate through radially placed tubes which form cylindrical channels through the passages, which pass through the machined plates. The inside wall of the tubular sections are in contact with fecralloy sheets, preferably corrugated, coated with a catalyst that induces the desired reaction. The assembly also includes an appropriately shaped reactor head that facilitates the introduction and distribution of the fuel and air mixture inside the tubular sections and an appropriately shaped reactor head that facilitates the collection and exit of the combustion products. The fuel and steam mixture are introduced to the reformer through a radially placed tube in the outer passage which communicates with the restricted by the machined plates passages through the radially placed channels. A second tube, also radially placed, and in flow contact with the opposite axial side of the outer passage, collects the hydrogen rich stream.

According to another feature of the invention, multiple steel plates are bundled together forming rectangular passages. On top of a plate with an "S" shape flow passage containing a catalyst as described above is placed a straight passage, then a an "S" shape passage flow is placed, and so on. The assembly also includes an appropriately shaped reactor head that facilitates the introduction and distribution of the fuel and air mixture inside the rectangular passages of "S" shape and an appropriately shaped reactor head that facilitates the collection and exit of the combustion products. An appropriately shaped reactor head facilitates the introduction and distribution of the fuel and steam mixture inside the straight rectangular passages and an appropriately shaped reactor head facilitates the collection and exit of the reforming products. One of the plates is extended longitudinally in order to separate the reactor heads of the reforming side in two parts. From the reactor head part which is below the extended plate the fuel and steam mixture is inserted in the reactor while from the reactor head part which is above the reactor the produced hydrogen is collected.

These and other features and advantages of the present invention will become apparent from the following description of the invention and the associated drawings.

DETAILED DESCRIPTION OF THE PREFERRED EMBODIMENTS

The present invention is described in detail with reference to a few preferred embodiments illustrated in the accompanying drawings. The description presents numerous specific details included to provide a thorough understanding of the present invention. It will be apparent, however, to one skilled in the art that the present invention can be practiced without some or all of these specific details. On the other hand, well known process steps, procedures and structures are not described in detail as to not unnecessarily obscure the present invention.

Figure 1A:
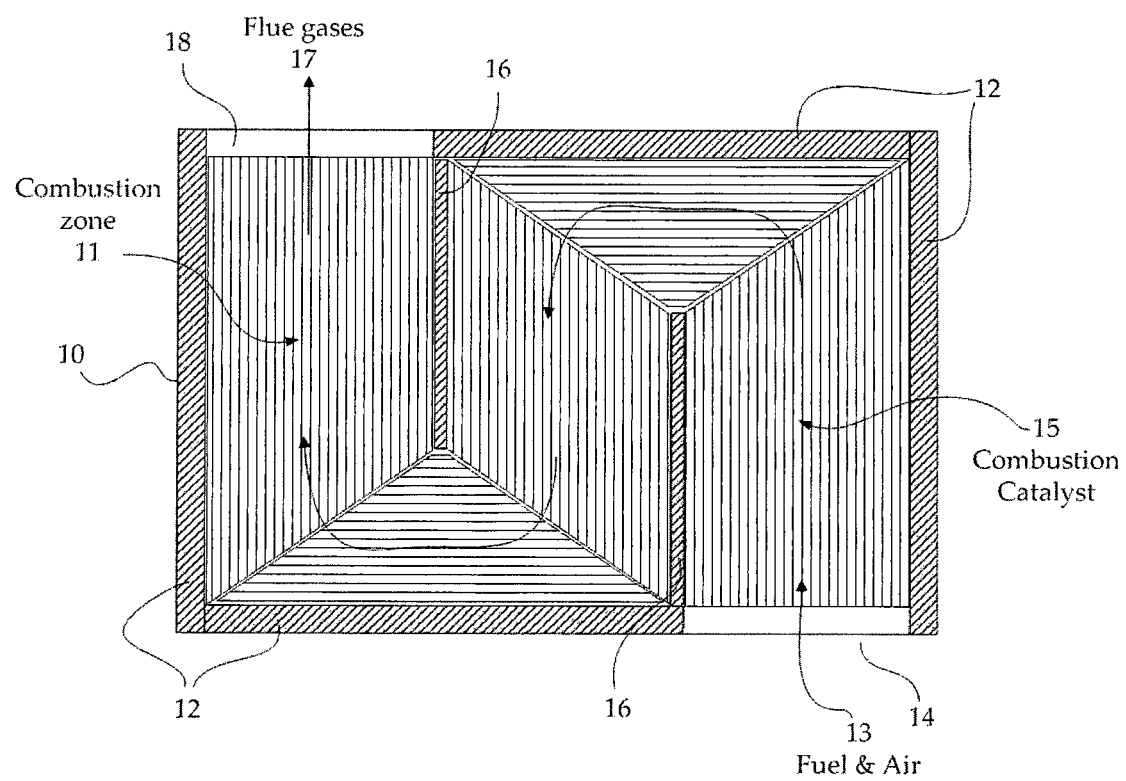
FIG. 1A is a perspective view of the combustion zone of one embodiment of the invention of the heat integrated reformer with catalytic combustion, which is of the plate type.

FIG. 1A illustrates the "S" shape flow passage of the combustion zone of a plate-type reformer according to one embodiment of the present invention. The combustion flow passage assembly includes a plate 10 that separates the combustion zone 11 from the reforming zone. The steel strips 12 placed suitably in the perimeter of the rectangular plate restrict flow to the desired direction and act as the reactor wall. A fuel and air mixture 13 is supplied through flow passage 14. The flow passage contains a structured combustion catalyst. An example of a structured catalyst is a fecralloy sheet, preferably corrugated, which is coated with a combustion catalyst 15 that induces the desired reaction in the combustor feed. The suitably positioned baffles 16 drive the combustion flow to form an "S" shape. The flue gases 17 exit the tubular section through flow passage 18. The combustion catalyst could be Pt or Pd and combinations thereof or base metals and base metal oxides.

Figure 1B:
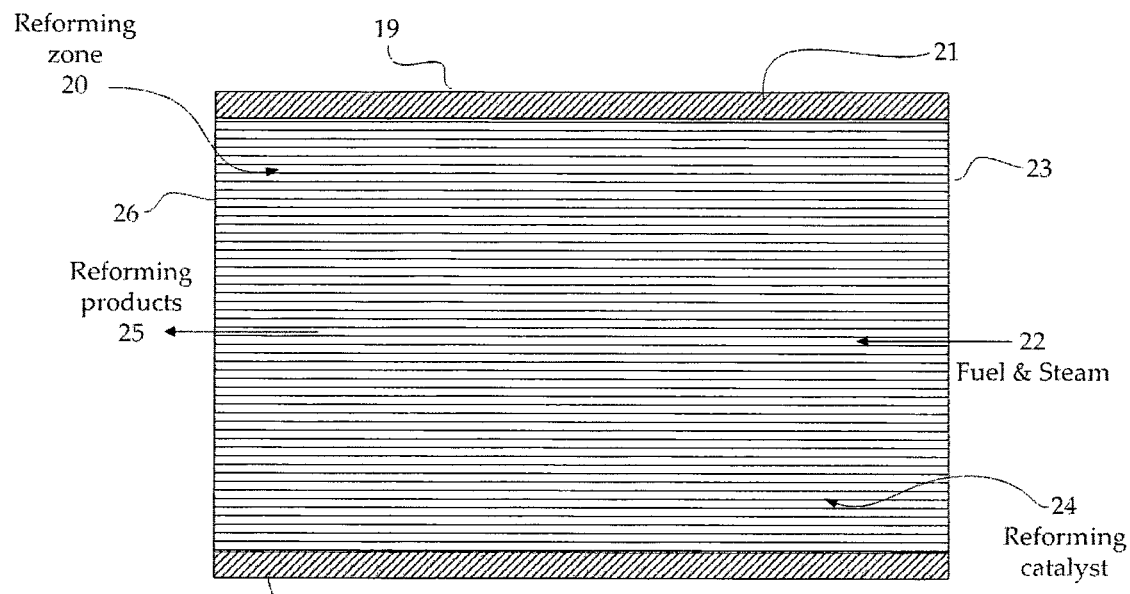
FIG. 1B is a perspective view of the reforming zone of one embodiment of the invention of the heat integrated reformer with catalytic combustion, which is of the plate type.

FIG. 1B illustrates the reforming flow passage according to the same embodiment of the present invention. The flow passage assembly includes a plate 10 (of FIG. 1A) that separates the combustion zone 11 (of FIG. 1A) from the reforming zone 20. The steel strips 21 placed suitably in parallel with the rectangular plate, restrict flow to the desired direction and act as the reactor wall. A fuel and steam mixture 22 is supplied through flow passage 23. The flow passage contains a structured reforming catalyst. An example of a structured catalyst is a fecralloy sheet, preferably corrugated, which is coated with a reforming catalyst 24 that induces the desired reaction in the combustor feed. Suitable reforming catalysts include but are not limited to nickel, ruthenium, precious metals and combinations thereof. The reforming products 25 exit the tubular section through flow passage 26

The fuel to the combustor can be any available and suitable fuel. Such fuels include methane, natural gas, propane, butane, liquefied petroleum gas, biogas, methanol, ethanol, higher alcohols, ethers, gasoline, diesel etc. For the embodiment illustrated in FIGS. 1A and 1B, the fuels normally available in liquid form must be vaporized before entering the combustion zone. The same fuels can be fed to the reforming zone to undergo the hydrogen producing reforming reactions. Another potential fuel to the combustor is the hydrogen depleted off-gas from the anode of a fuel cell when the reformer is used as a part of a fuel processor producing hydrogen for a fuel cell, or the hydrogen depleted gas from hydrogen separation membrane or the hydrogen depleted gas from a Pressure Swing Adsorption (PSA) unit.

The composition of the gas mixture entering the combustor should be such as to ensure complete combustion of the fuel. Although a stoichiometric ratio of air to fuel is sufficient, higher ratios can be employed with the present invention. The composition of the mixture entering the reforming section of the assembly is determined by the stoichiometries of the reforming reactions for the given fuel. It is typical practice to provide a higher than stoichiometric steam-to-fuel ratio to minimize possible side reactions that can cause shoot or carbon formation to the detriment of the catalyst and/or the reactor. All suitable steam-to-carbon ratios in the range from 1 to 25 can be employed with the present invention.

The structured combustion catalyst can preferably be in the form of a corrugated metal foil made of a high temperature resistant metal or metal alloy. A metal alloy such as an alloy with the formula FeCrAlY, commonly referred as fecralloy, can be used for high temperature combustion catalyst support. The wall 10 can be constructed from any material, but materials that offer low resistance to heat transfer such as metals and metallic alloys are preferred. In this configuration, heat is generated by combustion in the catalytic chamber and is transported very easily and efficiently though the wall 10 to the reforming chamber where the heat demanding reforming reactions take place. Heat is generated where it is needed and does not have to overcome significant heat transfer resistances to reach the demand location resulting in high efficiencies. The presence of a catalyst and lower temperatures permit significantly higher space velocities to be used compared to flame based reformers. Space velocity is defined as the ratio of the feed flow at standard conditions to the empty volume of the reactor. For the catalyst section of the heat integrated reformer space velocities of 1000 to 100000 $hr^{-1}$, more preferably 5000-50000 $hr^{-1}$ and even more preferably 10000 to 30000 $hr^{-1}$ can be used. In flame based reformers space velocities are typically bellow 2000 $hr^1$.

The catalyst on the reforming side can be a structured catalyst, in which case high space velocities can be used, preferably 10,000-100,000 $hr^{-1}$ or, more preferably, 7,500-15,000 $hr^{-1}$ The suitable combustion and the reforming catalysts can be prepared by coating a relatively thin (5-1000 μm thick) catalytic film on the fecralloy sheets. Suitable catalysts typically consist of a support and one or multiple metal phases dispersed on the support. The support is typically a metal oxide that may contain oxides of one or multiple elements from the IA, IIA, IIIA, IIIB and IVB groups of the periodic table of elements. The most typical combustion catalysts support is aluminum oxide. The dispersed metal phase may contain one or multiple elements from the IB, IIB, VIB, VIIB and VIII groups of the periodic table of elements. One method to prepare the catalytic film that ensures good adhesion to the fecralloy is to heat the fecralloy sheet to elevated temperatures in air. During the heating, aluminum, which is a component of the fecralloy, is diffusing out of the bulk of the alloy and forms an aluminum oxide surface layer. Upon this surface layer it is easy to coat alumina or other metal oxide supports for the desired dispersed metal phase which may be a precious or non-precious metal. Typical supports for reforming and combustion catalysts consist of oxides of aluminum, silicon, lanthanum, cerium, zirconium, calcium, potassium and sodium. The metal phase of reforming catalysts may contain nickel, cobalt, copper, platinum, rhodium and ruthenium. The metal phase of the combustion catalyst may contain platinum, palladium, rhodium nickel or any other metal that is active in catalytic combustion.

Coating of the catalysts support on the fecralloy sheets can be accomplished by many techniques. After heating up so as to form the aluminum oxide layer at the surface, techniques such as dip coating from a solution of dispersed metal oxide particles or from a slurry which contains the metal oxide particles can be employed. Alternatively, catalyst can be deposited on the fecralloy sheets by spraying the catalytic components onto their surface, or by plasma deposition, etc. The catalyst support is then dried by calcination at elevated temperatures. The dispersed metal phase can be added to the support forming solution or slurry of the metal oxide particles or it can be added in a separate step from a solution of the desirable metal salt after the calcination step.

The temperatures and pressures of the two streams entering the combustion zone and the reforming zone, respectively, need not to be the same. Typically, combustion takes place at low or near-atmospheric pressure, although high pressure combustion is practiced. Reforming can take place at pressures somewhat above atmospheric up to 30 barg. The wall of the flow passages should be of sufficient strength to allow for the pressure differential between the two streams.

The major advantage of the present invention is the heat integration between the combustion 11 and the reforming 20 zones. Combustion takes place on the catalytic film which is coated on the structured catalyst 15 placed on one side of the plate 10 separating the two zones. The heat that is generated on the combustion side is quickly transferred and used on the reforming side. This rapid heat transfer is critical in maintaining the combustion side catalyst at temperatures below 1200 C and more preferably below 1000 C. These temperatures ensure acceptable catalyst life and permit the use of a very compact combustion zone which allows the reactor assembly to be dramatically smaller compared with a flame based reformer which needs to maintain a significant distance between the flame generation and the reforming sections. The lower temperatures also allow the use of less expensive alloys for the construction of the reactor. The lower temperatures also mean that there are no nitrogen oxide emissions as their formation require much higher temperatures.

Figure 1C:
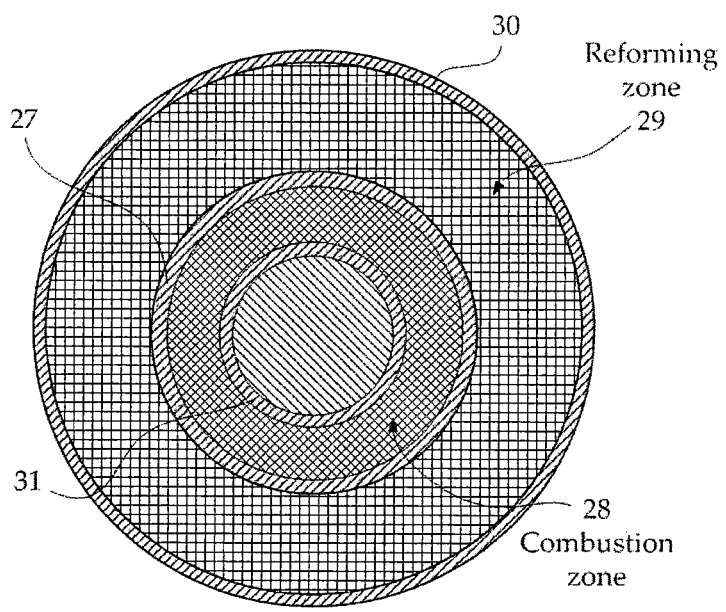
FIG. 1C is a perspective view of another embodiment of the invention of the heat integrated reformer with catalytic combustion, which is of the cylindrical type.

FIG. 1C illustrates a lateral cross-section of an integrated reformer according to another embodiment of the present invention. The integrated combustor/steam reformer assembly includes a tubular section defined by a cylindrical wall 27 which separates the combustion zone 28 from the reforming zone 29. The assembly housing 30 acts as the reactor wall and define an axially extending concentric annular passage in heat transfer relation with the tubular section. In the centre of the combustion zone a tapped tube 31 is inserted so as to reduce the combustion flow cross section area.

Figure 1D:
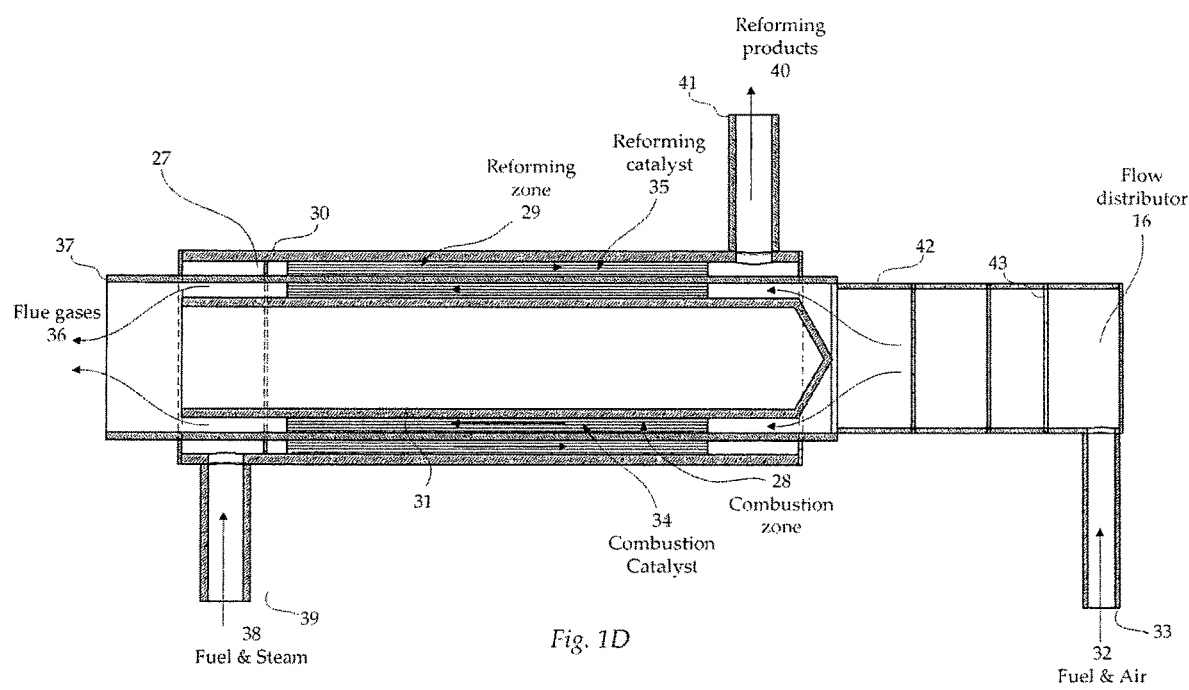
FIG. 1D is a another perspective view of one embodiment of the invention of the heat integrated reforming reformer with catalytic combustion, which is of the cylindrical type

FIG. 1D illustrates an axial cross section of the same integrated reformer as illustrated in FIG. 1C. The integrated combustor/steam reformer assembly includes a tubular section defined by a cylindrical wall 27 that separates the combustion zone 28 from the reforming zone 29. The assembly housing 30 acts as the reactor wall and defines an axially extending concentric annular passage in heat transfer relation with the tubular section. In the centre of the combustion zone a tapped tube 31 is inserted so as to reduce the combustion flow cross section area.

A fuel and air mixture 32 is supplied to the tubular section through flow passage 33. In this embodiment the flow passage of the tubular section contains the combustion catalyst 34 deposited on a corrugated fecralloy sheet that induces the desired reaction in the combustor feed. Similarly, the outside of the tubular section contains fecralloy sheets coated with reforming catalyst 35 that induces the desired reaction in the reformer feed. The products of the combustion reactions 36 exit the tubular section through flow passage 37. A fuel and steam mixture 38 is supplied to the annular passage through flow passage 39 counter-current or co-current to the combustion gases. The products of the reforming reactions 40 exit the annular passage through flow passage 41.

The reactor assembly includes a flow distributor 16 as to allow for uniform feeding of the annular combustion zone 28. The flow distributor consists of a cylindrical cross section 42 and multiple perforated sheets 43 placed against the combustion feed flow passage. The perforated steel sheet 43 has holes of 0.5-1 mm diameter with a density of 20-50 holes per cm2 and subsequently a flow area which is 5-20% of the flow area of the cylindrical cross section 42. Due to the pressure drop created on the perforated sheet, the flow of the gas is distributed evenly in the cylindrical cross section 42. In a way, the holes of the perforated sheet act as spraying nozzles and the flow distributor as a static mixer with a pressure drop of 15-250 mbar, which is much lower than the commonly used static mixers. The size and the density of the perforated sheet holes as well as the distance between the perforated sheets is of critical importance and depends on various reformer sizing parameters such as capacity, type of fuel, desired pressure drop etc. The preferable distance between perforated sheets is 15-50 mm.

Figure 2A:
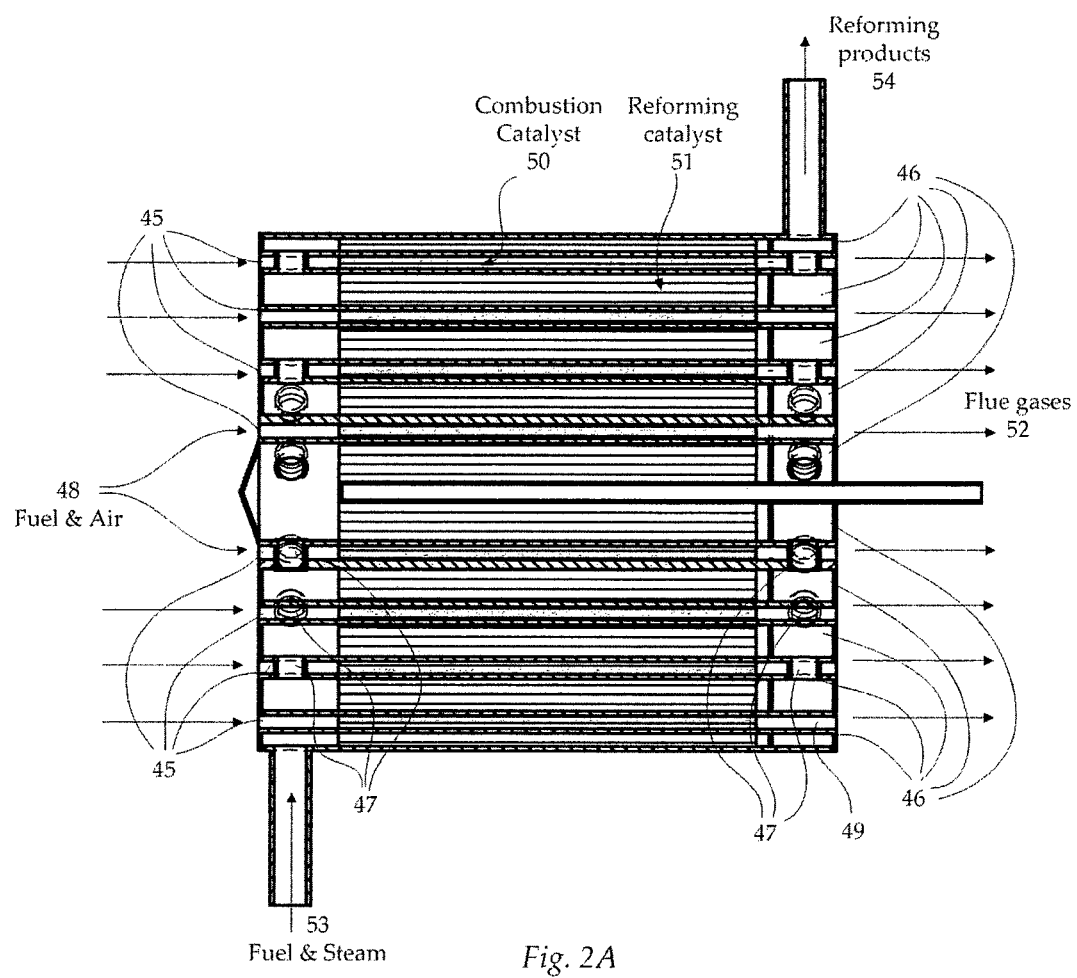
FIG. 2A is a perspective view of one embodiment of the invention of the heat integrated reforming reactor with catalytic combustion, comprising of multiple concentric cylindrical sections.
Figure 2B:
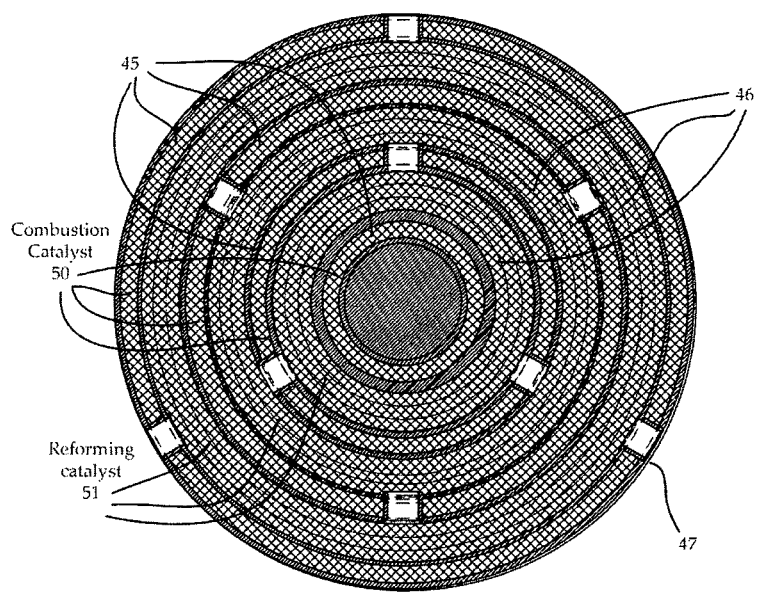
FIG. 2B is a perspective view of another embodiment of the invention of the heat integrated reforming reactor with catalytic combustion, comprising of multiple concentric cylindrical sections.

FIG. 2A and FIG. 2B illustrate one embodiment of a complete heat integrated reforming reactor, which is of the cylindrical form. The reactor consist of multiple cylindrical cross sections 44 placed concentrically forming combustion flow passages 45 in contact with reforming flow passages 46. Reforming flow passages communicate through radially placed cylindrical channels 47. A fuel and air mixture 48 is supplied to the annular sections through flow passage 45. The combustion flow passages 45 contain the combustion catalyst 50 deposited on a corrugated fecralloy sheet that induces the desired reaction in the combustion zone. Similarly, the reforming flow passages 46 contain fecralloy sheets coated with reforming catalyst 51 that induces the desired reaction in the reforming zone. The products of the combustion reactions 52 exit the reactor through flow passage 49. A fuel and steam mixture 53 is supplied to the annular passages through flow passage 46 and cylindrical channels 47 counter-current or co-current to the combustion gases. The products of the reforming reactions 54 exit the annular passage through radial channels 47 and flow passage 46.

This embodiment may contain also a flow distributor for uniform feeding of the combustion flow passage as described in FIG. 1D.

Figure 2C:
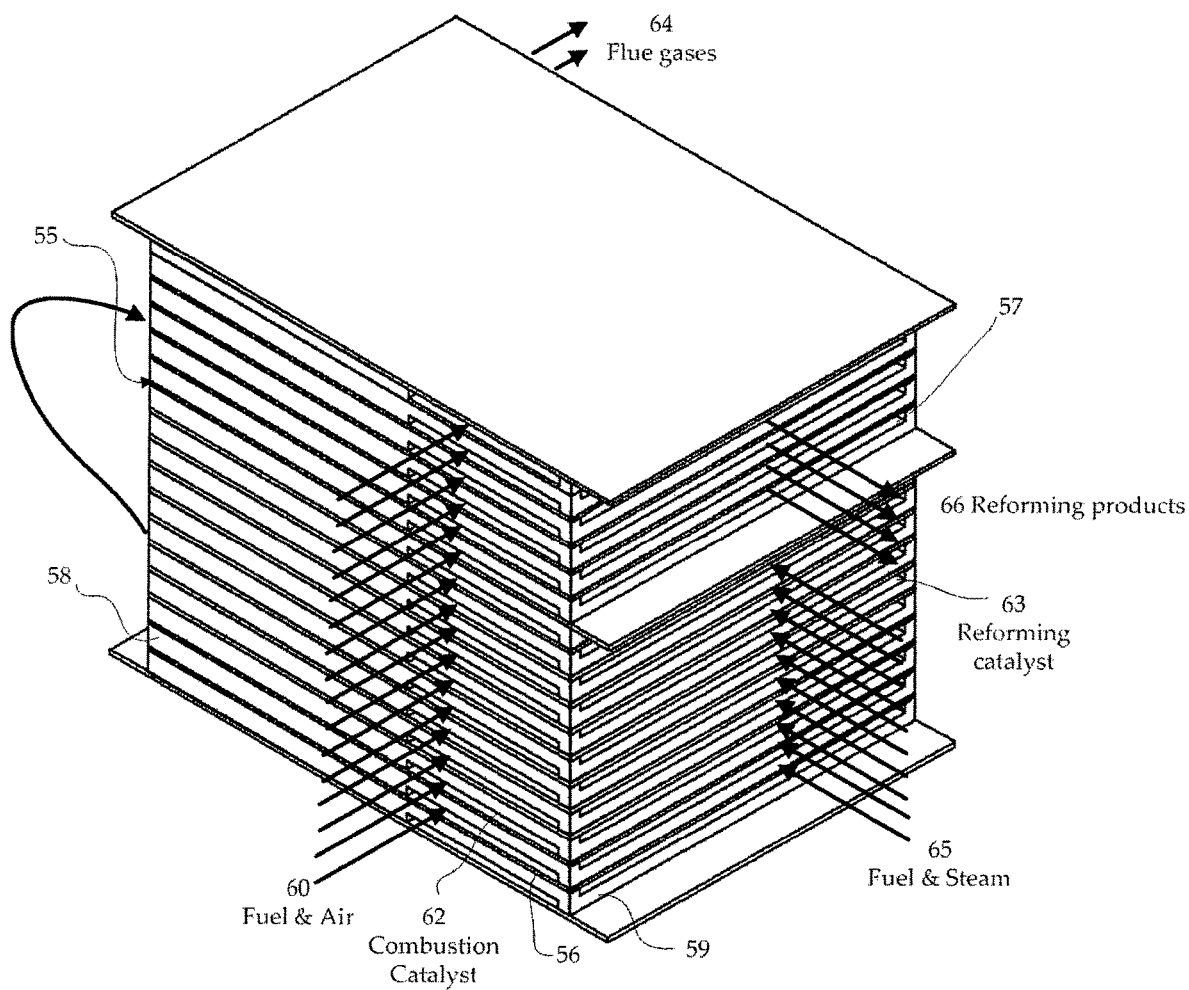
FIG. 2C is a perspective view of another embodiment of the invention of the heat integrated reforming reactor with catalytic combustion, comprising of a stack of multiple rectangular plates.

FIG. 2C illustrates another embodiment of a complete heat integrated reforming reactor with catalytic combustion, which is of the plate form. The reactor consists of multiple rectangular steel sheets 55 placed one on top of the other forming combustion flow passages 56 in contact with reforming flow passages 57. Reforming flow is restricted in reforming flow passage with steel rectangular strips 58 placed accordingly. Combustion flow is restricted in combustion flow passage with steel rectangular strips 59 placed accordingly. Combustion flow may have an "S" type flow shape as briefly described in FIG. 1A. A fuel and air mixture 60 is supplied to the combustion passage 56. The combustion flow passages 56 contain the combustion catalyst 62 deposited on a corrugated fecralloy sheet that induces the desired reaction in the combustor feed. Similarly, the reforming flow passages 57 contain fecralloy sheets coated with reforming catalyst 63 that induces the desired reaction in the reformer feed. The products of the combustion reaction 64 exit the reactor through rectangular combustion flow passages 56. A fuel and steam mixture 65 is supplied to the reforming catalyst 63 through reforming flow passages 57 and cross flow to the combustion gases. The products of the reforming reactions 66 exit the reactor through reforming passage 57.

The heat integrated reforming reactor configurations described above offer several advantages over the conventional flame—based reforming reactors. The catalytic combustion takes place at lower temperatures, which permits close coupling of the combustion and reforming zones. In a flame based reformer, the flame must be at a significant distance from the tube containing the reforming catalyst to prevent the tube from melting. As a result, the integrated reforming reactor is several times smaller than a flame—based reforming reactor and, consequently, has a much lower capital and installation cost. The flame—based reformers can consist of hundreds of tubes and burners and a sophisticated feed flow distribution system is required to distribute the combustion feed and reforming feed to all burners and tubes evenly. The heat integrated reformer has a single inlet for the reforming and single inlet for the combustion feed gases which results in simple and inexpensive feed flow system. The flame reformers, even with the use of low NOx burners, still produce significant quantities of NOx in the combustion gases, which have to be controlled with a separate selective catalytic reduction (SCR) catalyst and ammonia injection. The heat integrated reformer described within operates at low temperatures on the combustion side at which NOx formation is negligible.

The fuel feed to the reformer can be natural gas, liquefied petroleum gas (LPG), propane, naphtha, diesel, ethanol or other biofuels, or combinations of these fuels.

While this invention has been described in terms of several preferred embodiments, there are alterations, permutations and equivalents that fall within the scope of the present invention and have been omitted for brevity. It is therefore intended that the scope of the present invention should be determined with reference to appended claims.

What is claimed is:

1. A reformer for the production of hydrogen for fuel cell applications, from a fuel source, comprising:
 a combustion zone and a reforming zone, the combustion zone being configured to receive at least a combustion fuel and convert the combustion fuel into heat to provide the heat to the reforming zone disposed annularly about the combustion zone, wherein said reforming and combustion zones are separated by a separating wall, wherein the combustion zone includes a tapped tube disposed centrally having an open end and a closed end, the closed end configured to reduce a cross sectional flow of the combustion fuel,
 wherein the combustion zone on one side of the separating wall containing a combustion removable structured catalyst support coated with a catalyst to induce a fuel combustion reaction, the removable catalyst support being in contact with the separating wall, the separating wall being only partially covered with catalyst on each side, forming heat exchange zones where heat is transferred between the feed of the combustor and products of the reformer, and between the feed of the reformer and the products of the combustor, respectively;
 wherein the reforming zone being configured to receive at least a reforming fuel and to produce a reformate containing primarily hydrogen,
 wherein the reforming zone on another side of the separating wall containing a reforming structured catalyst support is coated with a catalyst able to induce fuel forming reactions, and
 wherein the reforming structured catalyst includes a high space velocity of between 7,500-15,000 $hr^{-1}$.

2. The reformer of claim 1, wherein the combustion and the reforming structured catalyst supports are made of fecralloy sheets.

3. The reformer of claim 2, wherein the fecralloy sheets of the combustion structured catalyst support are coated with a high surface area alumina film.

4. The reformer of claim 2, wherein the fecralloy sheets of the reforming structured catalyst support are coated with a high surface area alumina film.

5. The reformer of claim 2, wherein the fecralloy sheets are corrugated.

6. The reformer of claim 3, wherein the high surface area alumina film contains at least one of a dispersed metal phase of ruthenium, nickel, platinum, rhodium, a mixture thereof, or of base metals.

7. The reformer of claim 1, wherein the high surface area alumina film contains at least one of a dispersed metal phase of ruthenium, nickel, platinum, rhodium, a mixture thereof, or of base metals.

8. A reformer for the production of hydrogen for fuel cell applications, from a fuel source, comprising:
 a combustion zone and a reforming zone, the combustion zone being configured to receive at least a combustion fuel and convert the combustion fuel into heat to provide the heat to the reforming zone disposed annularly about the combustion zone, wherein said reforming and combustion zones are separated by a separating wall, wherein the combustion zone includes a tapped tube disposed centrally having an open end and a closed end, the closed end configured to reduce a cross sectional flow of the combustion fuel,
 wherein the combustion zone on one side of the separating wall containing a combustion removable structured catalyst support coated with a catalyst to induce a fuel combustion reaction;
 wherein the reforming zone on another side of the separating wall containing a reforming structured catalyst support is coated with a catalyst able to induce fuel forming reactions, and
 wherein the reforming structured catalyst includes a high space velocity of between 7,500-15,000 $hr^{-1}$.

9. The reformer of claim 8, wherein the combustion and the reforming structured catalyst supports are made of fecralloy sheets.

10. The reformer of claim 9, wherein the fecralloy sheets of the combustion structured catalyst support are coated with a high surface area alumina film.

11. The reformer of claim 9, wherein the fecralloy sheets of the reforming structured catalyst support are coated with a high surface area alumina.

12. The reformer of claim 9, wherein the fecralloy sheets are corrugated.

13. The reformer of claim 10, wherein the high surface area alumina film contains at least one of a dispersed metal phase of ruthenium, nickel, platinum, rhodium, or a mixture thereof, or of base metals.

14. The reformer of claim 8, wherein the high surface area alumina film contains at least one of a dispersed metal phase of ruthenium, nickel, platinum, rhodium, a mixture thereof, or of base metals.

\* \* \* \* \*